(12) United States Patent
Vukich et al.

(10) Patent No.: US 11,301,862 B2
(45) Date of Patent: Apr. 12, 2022

(54) SECURE TRANSFER OF TOKENS BETWEEN DEVICES

(71) Applicant: Capital One Services, LLC, McLean, VA (US)

(72) Inventors: Adam Vukich, Alexandria, VA (US); Abdelkader M'Hamed Benkreira, Washington, DC (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 35 days.

(21) Appl. No.: 16/152,343

(22) Filed: Oct. 4, 2018

(65) Prior Publication Data

US 2020/0111102 A1 Apr. 9, 2020

(51) Int. Cl.
| | |
|---|---|
| *G06Q 20/40* | (2012.01) |
| *G06Q 20/32* | (2012.01) |
| *G06Q 20/38* | (2012.01) |
| *H04W 12/06* | (2021.01) |
| *H04L 29/06* | (2006.01) |

(52) U.S. Cl.
CPC ....... *G06Q 20/4018* (2013.01); *G06Q 20/327* (2013.01); *G06Q 20/3829* (2013.01); *H04L 63/08* (2013.01); *H04W 12/06* (2013.01); *G06Q 2220/00* (2013.01)

(58) Field of Classification Search
CPC ............. G06Q 20/4018; G06Q 20/327; G06Q 20/3829; G06Q 2220/00; G06Q 20/3823; G06Q 20/3672; G06Q 20/385; G06Q 20/40145; H04W 12/06; H04W 12/03; H04W 4/80; H04L 63/08
See application file for complete search history.

(56) References Cited

U.S. PATENT DOCUMENTS

| | | | |
|---|---|---|---|
| 2008/0223918 A1 | 9/2008 | Williams et al. | |
| 2009/0198617 A1* | 8/2009 | Soghoian | G06Q 20/3823 705/65 |
| 2009/0215394 A1* | 8/2009 | Dewan | G06Q 20/202 455/41.2 |
| 2012/0030047 A1 | 2/2012 | Fuentes et al. | |
| 2012/0316992 A1 | 12/2012 | Oborne | |
| 2014/0206290 A1* | 7/2014 | Lee | H04W 8/005 455/41.2 |
| 2014/0229375 A1 | 8/2014 | Zaytzsev et al. | |

(Continued)

OTHER PUBLICATIONS

Xiaolong et al., "Picking Up My Tab: Understanding and Mitigating Synchronized Token Lifting and Spending in Mobile Payment", Usenix Association, Proceedings of the 26th USENIX Security Symposium, Aug. 16-18, 2017, https://www.informatics.indiana.edu/xw7/papers/sec17-bai.pdf, 17 pages.

(Continued)

*Primary Examiner* — Jacob C. Coppola
(74) *Attorney, Agent, or Firm* — Kacvinsky Daisak Bluni PLLC

(57) ABSTRACT

Various embodiments are generally directed to the secure transfer of account tokens between devices. For example, a first device may receive an account token stored on a second device using web Bluetooth application programming interfaces (APIs). As another example, the second device may push the account token to the first device.

20 Claims, 12 Drawing Sheets

(56) References Cited

U.S. PATENT DOCUMENTS

| | | | |
|---|---|---|---|
| 2014/0337235 A1 | 11/2014 | Van Heerden et al. | |
| 2015/0170133 A1* | 6/2015 | Love | G06Q 20/3224 705/44 |
| 2016/0232515 A1* | 8/2016 | Jhas | G06Q 20/3224 |
| 2016/0321653 A1* | 11/2016 | Jacobs | G06Q 20/367 |
| 2017/0193468 A1* | 7/2017 | Chougule | G06Q 20/102 |
| 2017/0228737 A1* | 8/2017 | Babar | G06Q 20/40145 |

OTHER PUBLICATIONS

Contributors to the Web Bluetooth Specification, "Web Bluetooth", GitHub-Web Bluetooth Community Group, 2015 (last updated Jul. 31, 2018) https://webbluetoothcg.github.io/web-bluetooth/, 102 pages.

Beaufort, François, "Interact with Bluetooth devices on the Web", Google Developers, last updated Jul. 2, 2018, https://developers.google.com/web/updates/2015/07/interact-with-ble-devices-on-the-web, 21 pages.

Mozilla Developers Contributors, "Web Bluetooth API", Mozilla Developer, last updated Jun. 15, 2018, https://developer.mozilla.org/en-US/docs/Web/API/Web_Bluetooth_API, 3 pages.

Author Unknown, "Tez: Money Made Simple", Google, https://tez.google.com/, 8 pages.

Author Unknown, "Use AirDrop on your iPhone, iPad, or iPod touch", Apple Inc., Jun. 25, 2018, https://support.apple.com/en-us/HT204144, 3 pages.

\* cited by examiner

Computing Device 104

Complete Checkout:

Payment: Payment Token 109   | Select Token 311 |

Name: [                    ]

Shipping Address: [                    ]

Billing Address: [                    ]

CARD NUMBER: | Account Number 201 |

EXPIRATION DATE: | Expiration Date 202 |

SECURITY CODE: | CVV 203 |

| Submit |

SECURE TRANSFER OF TOKENS BETWEEN DEVICES

TECHNICAL FIELD

Embodiments herein generally relate to computing devices, and more specifically, to the secure transfer of payment tokens between computing devices.

BACKGROUND

Payment tokens are software objects that represent an account, such as a bank account, credit card account, and the like. Payment tokens may be used to process payments without exposing actual account identifiers (e.g., primary account numbers, also referred to as "PANs"). Once a payment token is generated, the token must be secured, otherwise unauthorized users may attempt to use the token to complete unauthorized transactions. Often, payment tokens are stored on a single device. Transferring stored payment tokens to other devices would be advantageous to authorized users who need to use the payment token on other devices. However, doing so presents additional security risks that must be managed. For example, security mechanisms developed for one type of device or operating system may not be compatible with all types of devices or operating systems.

BRIEF DESCRIPTION OF THE DRAWINGS

FIGS. 3A-3D depict examples of secure transfer of payment tokens between devices.

DETAILED DESCRIPTION

Figure 1:
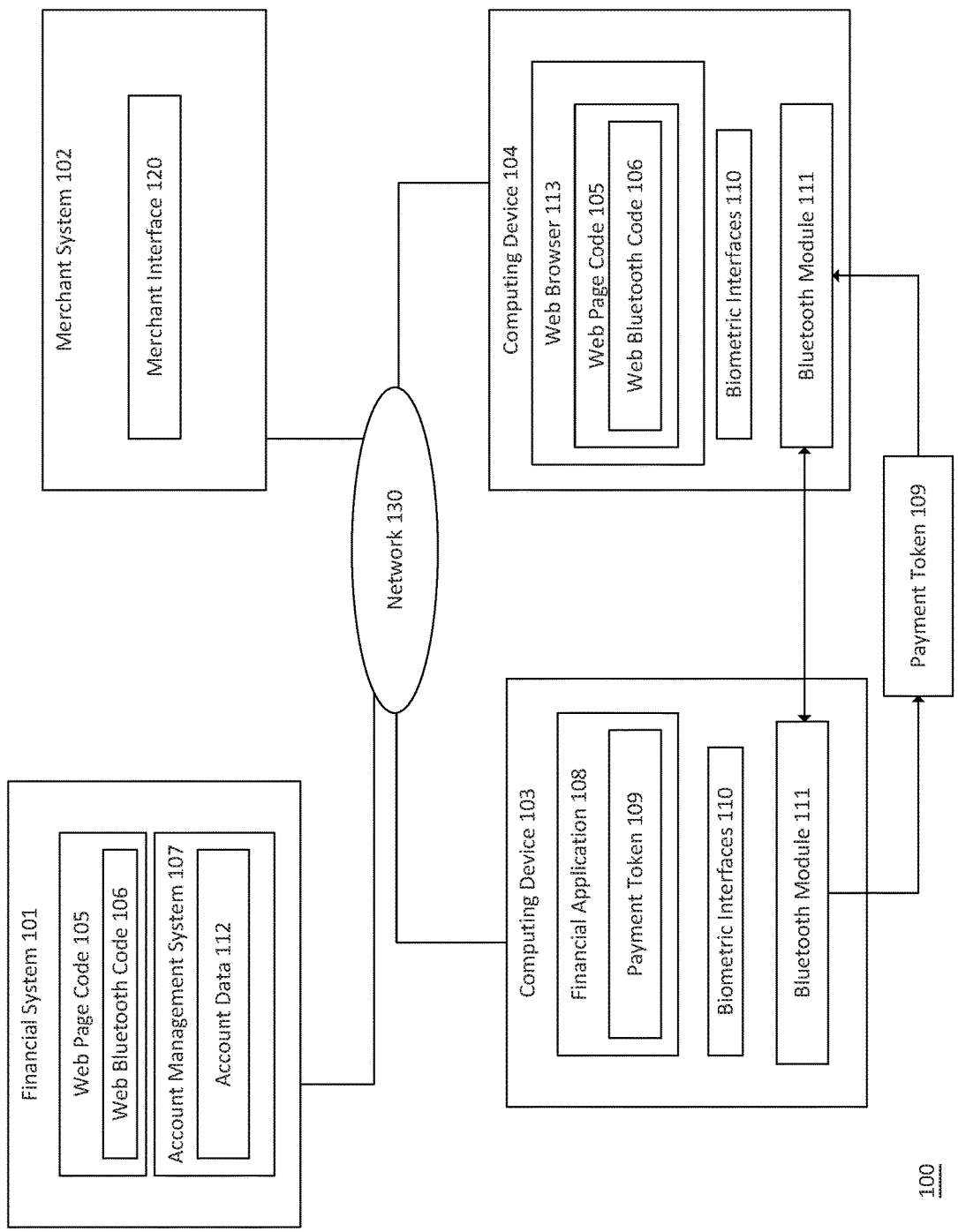
FIG. 1 illustrates an embodiment of a system.

Embodiments disclosed herein provide techniques to securely transfer payment tokens between different computing devices. For example, a user may request to generate a payment token using a smartphone application provided by their credit card provider. Once received, the token may be stored in a memory of the smartphone. The user may then use a web browser on a different device to log in to their credit card account. Advantageously, the web pages provided by the credit card provider may include web Bluetooth® application programming interfaces (APIs) that allow the user to specify to establish a Bluetooth connection with the smartphone and receive the payment token from the smartphone. The received payment token may then be used to complete a transaction, e.g., purchasing a product, fulfilling a payment obligation, paying for a service, and the like.

Furthermore, the payment token may have associated attributes that limit the use of the payment token. For example, the smartphone user in the previous example may specify that their child can use the payment token to purchase lunch at school during weekdays. The smartphone user may then transfer the payment token to their child's smartphone via a wireless data connection (e.g., a Bluetooth connection, a Wi-Fi connection), etc. The child may then use the payment token to purchase lunch at school in compliance with the attributes. In another example, the child may receive the payment token on their computing device using the web Bluetooth functionality described herein.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1 depicts a schematic of an exemplary system 100, consistent with disclosed embodiments. As shown, the system 100 includes a financial system 101, a merchant system 102, a computing device 103, and a computing device 104. The financial system 101 is representative of any number and type of computing system, such as a server, virtualized system, compute cluster, workstation, and the like. The financial system 101 is generally associated with a financial institution (e.g., bank, credit union, credit card provider, investment bank, etc.). As shown, the financial system 101 includes a web page code 105 and an account management system 107. The account management system 107 is generally configured to create and manage user accounts stored in the account data 112. The account data 112 may include generated payment tokens, account information, account restrictions, token restrictions, etc.

The web page code 105 is representative of any type of computer-readable code that may be rendered by a web browser (e.g., the web browser 113 of computing device 104). The web page code 105 includes a web Bluetooth code 106. The web Bluetooth code 106 is representative of code and/or web Bluetooth APIs that allows the web Bluetooth code 106 (and/or the web page code 105) to control Bluetooth devices (e.g., a Bluetooth module 111 of the computing devices 103, 104) without requiring a native application to control the Bluetooth device. The web page code 105 and the web Bluetooth code 106 may be written in any programming language, such as hypertext markup language (HTML), JavaScript, Python, PHP, and the like.

The computing devices 103, 104 are representative of any type of computing devices, such as a smartphone, laptop, desktop, workstation, server, and the like. As shown, the computing device 103 includes a financial application 108, one or more biometric interfaces 110, and a Bluetooth module 111. The financial application 108 is representative of any application provided by the financial institution associated with the financial system 101. For example, the financial application 108 may be a smartphone or tablet application provided by a bank. Using the financial application 108, an authenticated user may request to create a payment token. The financial application 108 may authenticate the user based on any number of authentication techniques, such as a username/password, PIN code, biometric identifiers received via the biometric interfaces 110 of the computing device 103. The account management system 107 may generate a payment token 109, which is transmitted to the computing device 103 via the network 130. The financial application 108 may receive the payment token 109, which may be stored in a memory (not pictured) of the computing device 103. In at least one embodiment, the account management system 107 encrypts the payment token 109 using a cryptographic encryption algorithm (or function) and a cryptographic key. The financial application 108 may receive a cryptographic key to decrypt the encrypted payment token. In at least one embodiment, the financial application 108 may store the payment token 109 in a digital wallet (not pictured), which may comprise a memory or other designated component of the computing device 103 (e.g., a near field communications (NFC) device).

The computing device 104 includes a web browser 113, one or more biometric interfaces 110, and a Bluetooth module 111. A web browser is an application for retrieving web pages (and other information) from a network location (e.g., the Internet) and displaying the web pages on a display. For example, a user of the computing device 104 may use the web browser 113 to retrieve and display the web page code 105 provided by the financial system 101. The web page code 105 in the web browser 113 may communicate with the financial system 101 to authenticate the user based on any number of authentication techniques, such as a username/password, PIN code, biometric identifiers received via the biometric interfaces 110 of the computing device 104, and the like. Once authenticated, the user may perform any number and type of operations associated with their account.

As stated, the web page code 105 includes the web Bluetooth code 106. Once authenticated, the user may provide input to the web page code 105 specifying to retrieve (or "pull") the payment token 109 from the computing device 103. To retrieve the payment token 109, the APIs of the web Bluetooth code 106 may communicate with the Bluetooth module 111 of the computing device 104 to discover other devices containing Bluetooth modules within a predefined distance of the computing device 104. The Bluetooth module 111 may then discover other devices within the predefined distance of the computing device, such as the computing device 103. In at least one embodiment, the Bluetooth modules 111 of the computing devices 103, 104 exchange information indicating that the computing device 103 has a payment token 109 that may be transferred (subject to authentication and/or other rules). The Bluetooth module 111 of the computing device 104 may then transmit, to the web Bluetooth code 106, an indication of each discovered device (e.g., the computing device 103). The web Bluetooth code 106 and/or the web page code 105 may then provide an interface comprising a list of the identified devices, allowing the user to select one or more of the identified devices.

For example, the user may select computing device 103 from the list. The web Bluetooth code 106 may then cause the Bluetooth modules 111 of the computing devices 103, 104 to establish a Bluetooth connection to exchange data. The web page code 105 and/or the web Bluetooth code 106 may then transmit, via the Bluetooth module 111 of the computing device 104, a request to receive the payment token 109 from the computing device 103. Responsive to receiving the request, the computing device 103 may determine whether the requesting entity is authorized to use the payment token 109. For example, the request may include an indication of an account number associated with the user of the computing device 104. The financial application 108 may determine whether the account number received in the request via the Bluetooth module 111 matches the account number associated with the payment token 109, and/or whether an attribute of the payment token 109 specifies the received account number as being permitted to use the payment token 109. As another example, the financial application 108 may determine whether an internet protocol (IP) address of the computing device 104 and/or the computing device 103 are associated with the payment token 109 in the account data 112. As another example, the financial application 108 may determine whether a hardware address (e.g., a media access control (MAC) address) of the Bluetooth modules 111 of the computing devices 103, 104 are associated with the payment token 109 in the account data 112. If the requesting user is not authorized, the financial application 108 may reject the request, and not transfer the payment token 109 to the computing device 104.

If the financial application 108 determines that the requesting user is authorized, the financial application 108 may also request additional authentication prior to transmitting the payment token 109. For example, the financial application 108 may request a login/password and/or a PIN. As another example, the financial application 108 may request that the user associated with the payment token 109 provide a fingerprint via the biometric interfaces 110 of the computing device 103. Although a fingerprint is one example of a biometric identifier, any number and type of biometric identifiers may be used. For example, the biometric interfaces 110 of the computing devices 103, 104 may include iris scanners, image capture devices to capture images and perform facial recognition, microphones to receive speech of the user and authenticate the user based on stored speech patterns, and the like. Once the financial application 108 authenticates the user, the financial application 108 may instruct the Bluetooth module 111 via one or more APIs to transmit the payment token 109 to the Bluetooth module 111 of the computing device 104, e.g., in one or more data packets. In one embodiment, the data packets are encrypted using a cryptographic key associated with the payment token 109. In another embodiment, the encrypted payment token 109 is transmitted in unencrypted data packets. In yet another embodiment, the data packets and the payment token 109 are encrypted.

Once received, the computing device 104 may store the payment token 109 in a memory (not pictured). The web page code 105 (or another component of the computing device 104) may decrypt the payment token 109 and/or the data packet using the cryptographic key (e.g., received from the account management system 107 and/or the computing device 103). The user may also specify to use the payment token 109 with the merchant interface 120 of the merchant system 102, e.g., to purchase a product, pay a bill, etc.

The merchant system 102 is representative of any type of computing system, and the merchant interface 120 is configured to process payments for transactions using payment tokens 109. For example, the merchant system 102 may be associated with an online retailer who sells goods. The user may specify to access the merchant interface 120 via the web browser 113. In some embodiments, the merchant interface 120 may require user authentication to access an account before receiving the payment token 109. In at least one embodiment, the computing device 104 receives the authentication credentials required to authenticate with the merchant interface 120 from the financial application 108 of the computing device 103 when receiving the payment token 109. In one embodiment, the financial application 108 provides the authentication credentials (e.g., a login/password, token, etc.) in the same data packet(s) as the payment token 109. In another embodiment, the financial application 108 provides the authentication credentials in data packets that do not include the payment token 109. In such embodiments, the web page code 105 and/or web Bluetooth code 106 of the computing device 104 may programmatically provide the authentication credentials and/or the payment token 109 to the merchant interface 120. For example, the merchant interface 120 may invoke the APIs of the web Bluetooth code 106 to receive the authentication credentials and/or the payment token 109 from the computing device 103.

In another embodiment, the user may manually authenticate with the merchant interface 120 (e.g., by providing a login/password via the web browser 113). Regardless of the authentication techniques used, the payment token 109 may be used to pay for transactions. For example, the web page code 105 and/or web Bluetooth code 106 of the computing device 104 may programmatically provide the payment token 109 to the merchant interface 120. In another example, the user may manually enter the information associated with the payment token 109. In yet another example, the web page code 105 may allow the user to copy the information associated with the payment token 109 to the clipboard of the computing device 104, which then allows the user to easily paste the copied information into the web browser 113 for submission to the merchant interface 120. Regardless of the techniques used to provide the payment token 109 to the merchant interface 120, the merchant interface 120 may accept the payment token 109 to complete the transaction.

Additionally and/or alternatively, the merchant interface 120 may reject the payment token 109, and refrain from completing the transaction. As stated, the payment token 109 may include associated criteria for use. For example, the payment token 109 may be restricted to a specified dollar amount, a duration of time the payment token can be used, one or more locations (virtual and/or physical) the payment token can be used, and the like. In such embodiments, the merchant interface 120 (and/or the financial system 101) may verify the payment token 109 meets each associated criterion before accepting and/or rejecting the payment token 109.

In one embodiment, a user of the computing device 103 may use the financial application 108 to generate a payment token 109, and directly broadcast the payment token 109 to the computing device (e.g., the computing device 104) of an intended recipient. Again, the generated payment token 109 may include attributes which specify enforceable parameters for using the payment token 109. In one embodiment, the financial application 108 may transmit the payment token 109 via the Bluetooth module 111 using one or more APIs. In one embodiment, the Bluetooth module 111 of the computing device 104 receives the payment token 109 and provides the payment token to an associated application (e.g., another instance of the financial application 108, the web page code 105 during an authenticated session, etc.) executing on the computing device 104 via one or more APIs of the application. However, in other embodiments, other wireless data communications techniques may be used to directly transmit the payment token 109 to a recipient (e.g., Wi-Fi, NFC, etc.).

Furthermore, although not depicted, the computing device 104 may also include an instance of the financial application 108 (e.g., to pull a payment token 109 from the computing device 103, to receive a payment token 109 pushed from the financial application 108 of the computing device 103, etc.). Similarly, the computing device 103 may include a web browser 113 for executing the web page code 105 and the web Bluetooth code 106 to pull payment tokens 109 from the financial application 108 of other devices. More generally, the system of FIG. 1 may include any number of instances of the computing devices 103, 104. Further still, the web page code 105 may be representative of the merchant interface 120, allowing the merchant interface 120 and/or the web page code 105 to receive payment tokens 109 from other devices, and use the payment token 109 to complete transaction in accordance with the restrictions associated with the payment token 109. Further still, the Bluetooth module 111 of the computing devices 103, 104, should not be considered limiting of the disclosure, as the disclosure is equally applicable to other types of wireless communication interfaces (e.g., Wi-Fi (or Wireless Fidelity), or WiMax devices).

Although FIG. 1 has been described with reference to authenticated sessions, in some embodiments, the web page code 105 and the financial application 108 may communicate as part of an unauthenticated session. However, in such an embodiment, the same person should have control over the unauthenticated sessions. Doing so may be advantageous where the computing device 104 is a public device (e.g., in a library), as the authentication credentials to access the account data 112 of the financial system 101 would not need to be provided via the computing device 104. Similarly, if the payment token 109 is programmatically provided to the merchant interface 120 (e.g., directly by the web page code 105 and/or by copying to the system clipboard), key logging programs would not be able to detect the data (e.g., an account number) of the payment token 109.

Figure 2:
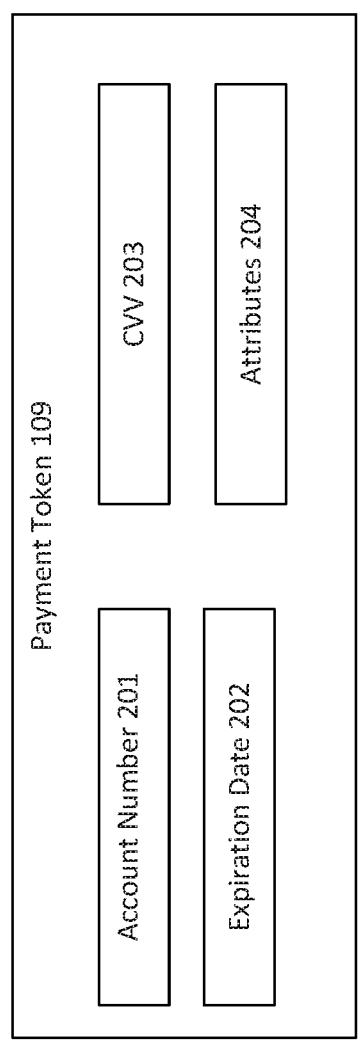
FIG. 2 illustrates an embodiment of a payment token.

FIG. 2 illustrates an embodiment of a payment token 109. As shown, the payment token 109 may include an account number 201, an expiration date 202, a card verification value (CVV) 203, and one or more attributes 204. The account number 201 may be a primary account number (PAN).

However, the account number 201 may also be a virtual account number that is associated with the primary account number. For example, if the PAN is a credit card number, the virtual account number may be a randomly generated series of numbers associated with the PAN. Doing so provides an extra layer of security by not exposing the PAN. The expiration date 202 specifies a date the payment token 109 expires. The CVV 203 is a series of digits which are used as additional security, as the CVV 203 may be required to process a transaction using the account number 201 of the payment token 109. The attributes 204 are representative of any number and type of attributes of the payment token 109. Example attributes include an authorized value of the payment token 109 (e.g., $20), one or more accounts authorized to receive the payment token 109, a duration of time the payment token 109 is valid for use, account information (e.g., billing address, zip code, etc.), and one or more permitted uses of the payment token 109 (e.g., with one or more merchant systems 102, one or more physical locations, etc.).

Figure 3A:
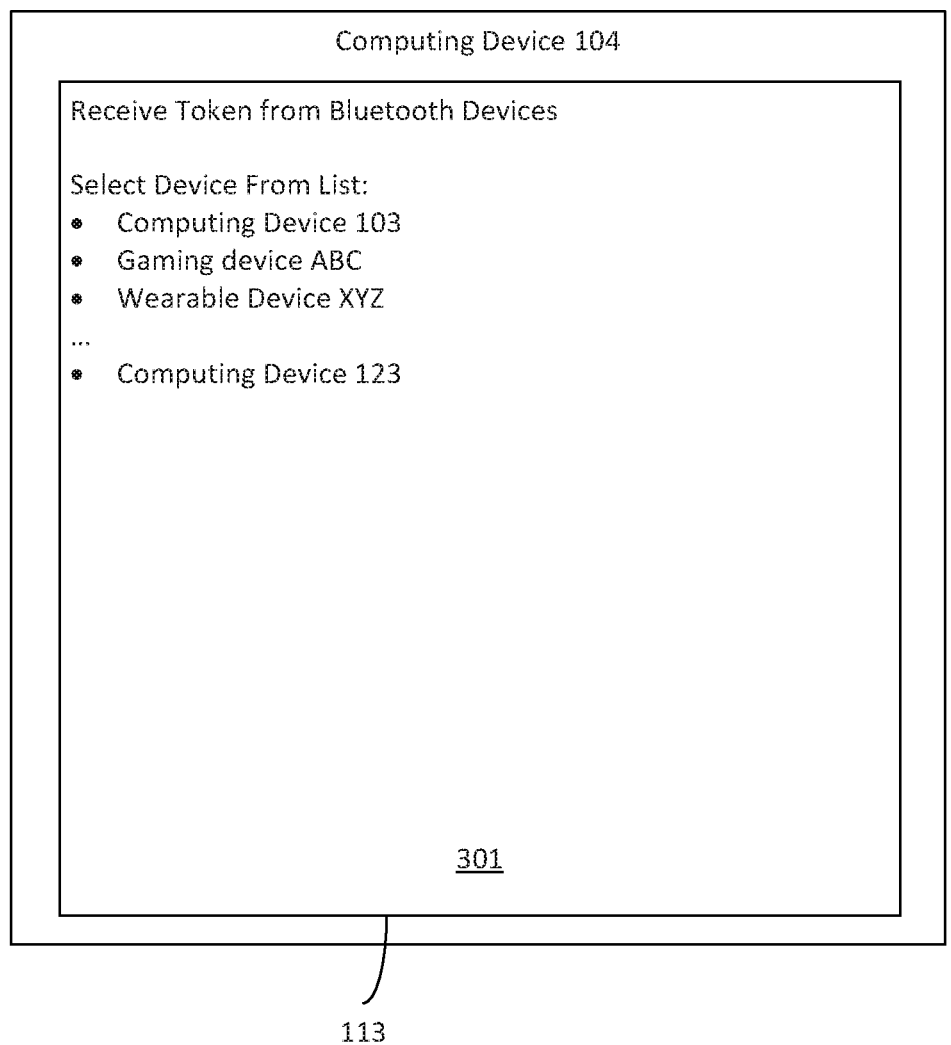

FIG. 3A depicts a graphical user interface (GUI) 301 used to facilitate the secure transfer of payment tokens between devices. As shown, the GUI 301 is outputted by the web browser 113 on a display of the computing device 104. As stated, the web browser 113 may load the web page code 105 from the financial system 101 to generate the GUI 301. As shown, the GUI 301 specifies a list of Bluetooth-enabled devices from which the user may receive a payment token 109. As stated, the list of Bluetooth-enabled devices may be generated by the web Bluetooth code 106 after discovering devices with Bluetooth modules 111 within the communications range of the Bluetooth module 111 of the computing device 104. Advantageously, doing so allows the web page code 105 to interact with the Bluetooth module 111 without being a native Bluetooth application. In at least one embodiment, the discovered devices provide an indication that the respective device stores a payment token 109. Once the user selects a device from the GUI 301, the web Bluetooth code 106 may establish Bluetooth communications with the selected device. For example, the user may select the computing device 103 from the list of the GUI 301, and the Bluetooth module 111 of the computing device 104 may establish a Bluetooth connection with the Bluetooth module 111 of the computing device 103.

Figure 3B:
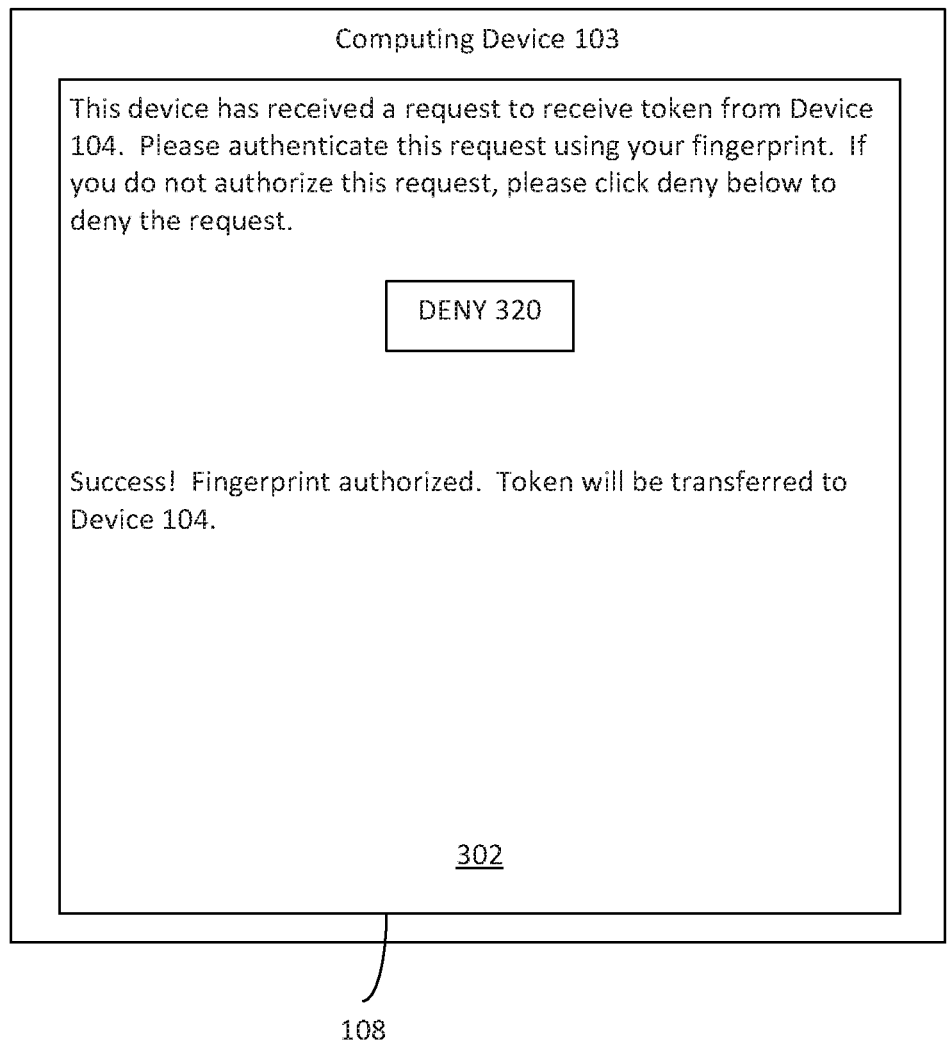

FIG. 3B depicts a GUI 302 of the computing device 103 that is generated by the financial application 108 after the Bluetooth module 111 of the computing device 104 establishes a Bluetooth connection with the Bluetooth module 111 of the computing device 103. As shown, the GUI 302 provides a layer of security by requiring the user of computing device 103 to authenticate using their fingerprint before permitting transfer of the payment token 109. If the user does not approve, the user may deny the request using the input button 320. If the user approves, the user may provide their fingerprint to the biometric interfaces 110, and the recorded fingerprint data may be used to authenticate the user. Once authenticated, the financial application 108 may use one or more APIs to transmit the payment token 109 to the computing device 104 via the Bluetooth connection.

Figure 3C:
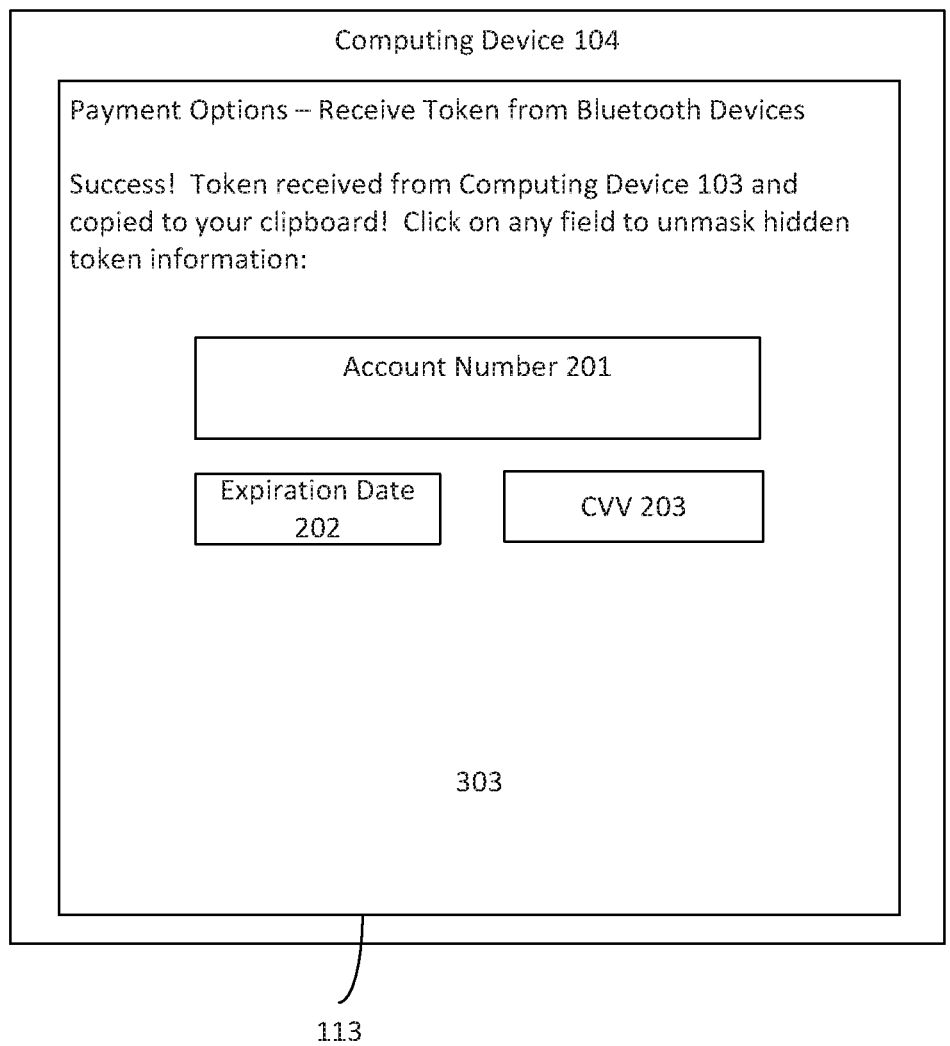

FIG. 3C depicts a GUI 303 generated by the web page code 105 and/or the web Bluetooth code 106 after the Bluetooth module 111 of the computing device 104 receives the payment token 109 from computing device 103. The Bluetooth module 111 of computing device 104 may provide the received token 109 to the web Bluetooth code 106, which in turn provides the payment token 109 to the web page code 105. The GUI 303 may then be used to output an indication that the payment token 109 was received. In at least one embodiment, the GUI 303 may also output the account number 201, expiration date 202, and CVV 203 for display. However, to provide additional security, the account number 201, expiration date 202, and CVV 203 may be modified (e.g., hidden, resized, and/or obscured) and revealed responsive to user input. As another example, a font size used to display the account number 201, expiration date 202, and CVV 203 may be reduced, thereby making the text too small for other users to read. The font may be enlarged responsive to user input, thereby allowing the account number 201, expiration date 202, and CVV 203 to be read more easily by the user.

FIG. 3D depicts a GUI 304 where the payment token 109 is used to complete a transaction (e.g., via the merchant interface 120). As shown, the user may use interface element 311 to select the payment token 109, which populates the account number 201, expiration date 202, and CVV 203 into the GUI 304. As another example, the web page code 105 may provide the GUI 304. In such an embodiment, the web page code 105 may automatically populate the payment token 109 (and therefore the account number 201, expiration date 202, and CVV 203) into the GUI 304. Doing so provides additional security and faster checkout via the GUI 304. In some embodiments, the account number 201, expiration date 202, and CVV 203 may be modified (e.g., masked using one or more predefined masking characters), reduced in size, etc., to prevent other users from viewing the information.

Figure 4:
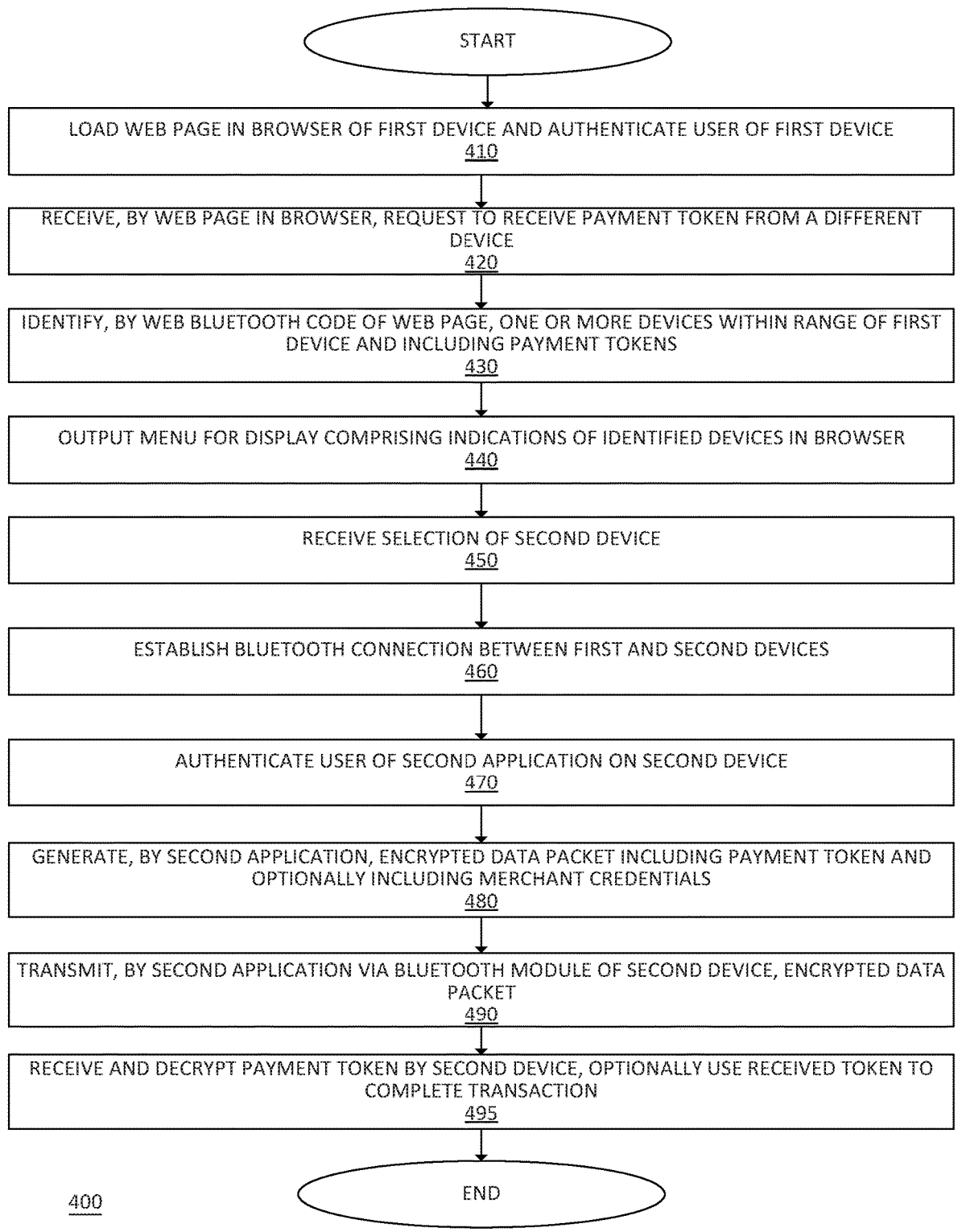
FIG. 4 illustrates an embodiment of a first logic flow.

FIG. 4 illustrates an embodiment of a logic flow 400. The logic flow 400 may be representative of some or all of the operations executed by one or more embodiments described herein. For example, the logic flow 400 may include some or all of the operations to allow the web Bluetooth code 106 of the computing device 104 to "pull" a payment token 109 from the computing device 103. Embodiments are not limited in this context.

In the illustrated embodiment shown in FIG. 4, the logic flow 400 may begin at block 410. At block 410, the web browser 113 of a first computing device (e.g., computing device 104) may load the web page code 105 of the financial system 101. The web page code 105 may authenticate the requesting user of the first device, e.g., using biometrics, login/password, etc., thereby granting the user access to their account data 112. At block 420, the web page code 105 may receive a request from the user specifying to receive a payment token 109 (e.g., from the computing device 103). At block 430, the web Bluetooth code 106 may cause the Bluetooth module 111 to identify one or more other devices including payment tokens 109 that are within range of the first device. At block 440, a menu including indications of each device identified at block 430 is outputted for display by the web page code 105 in the web browser. At block 450, user input selecting a second device (e.g., the computing device 103) is received.

At block 460, the web Bluetooth code 106 instructs the Bluetooth module 111 of the computing device 104 to establish a Bluetooth connection with the Bluetooth module 111 of the computing device 103. At block 470, a user of the computing device 103 is authenticated on a second application (e.g., the financial application 108). In at least one embodiment, the same user is authenticated on devices 103, 104. In other embodiments, different users are authenticated on devices 103, 104. At block 480, the financial application 108 generates one or more data packets including the payment token 109, and optionally including authentication credentials for a merchant interface 120. As stated, the data packets may be encrypted and/or the payment token 109 may be encrypted. Similarly, the authentication credentials may be encrypted. At block 490, the financial application 108 transmits the generated data packets including the payment token 109 (and optional merchant credentials) via the Bluetooth module 111 of the computing device 103 to the Bluetooth module 111 of the computing device 104. At block 495, the Bluetooth module 111 of computing device 104 receives the data packets. The Bluetooth module 111 of computing device 104 may then provide the received data packets to the web Bluetooth code 106, which may then provide the received data packets to the web page code 105. The web Bluetooth code 106, the web page code 105, and/or another designated component of the computing device 104 may then decrypt the data packets and/or the payment token 109 using a cryptographic key (which may be received at block 410). The decrypted payment token 109 may then optionally be used to complete a transaction, e.g., with the merchant system 102.

Figure 5:
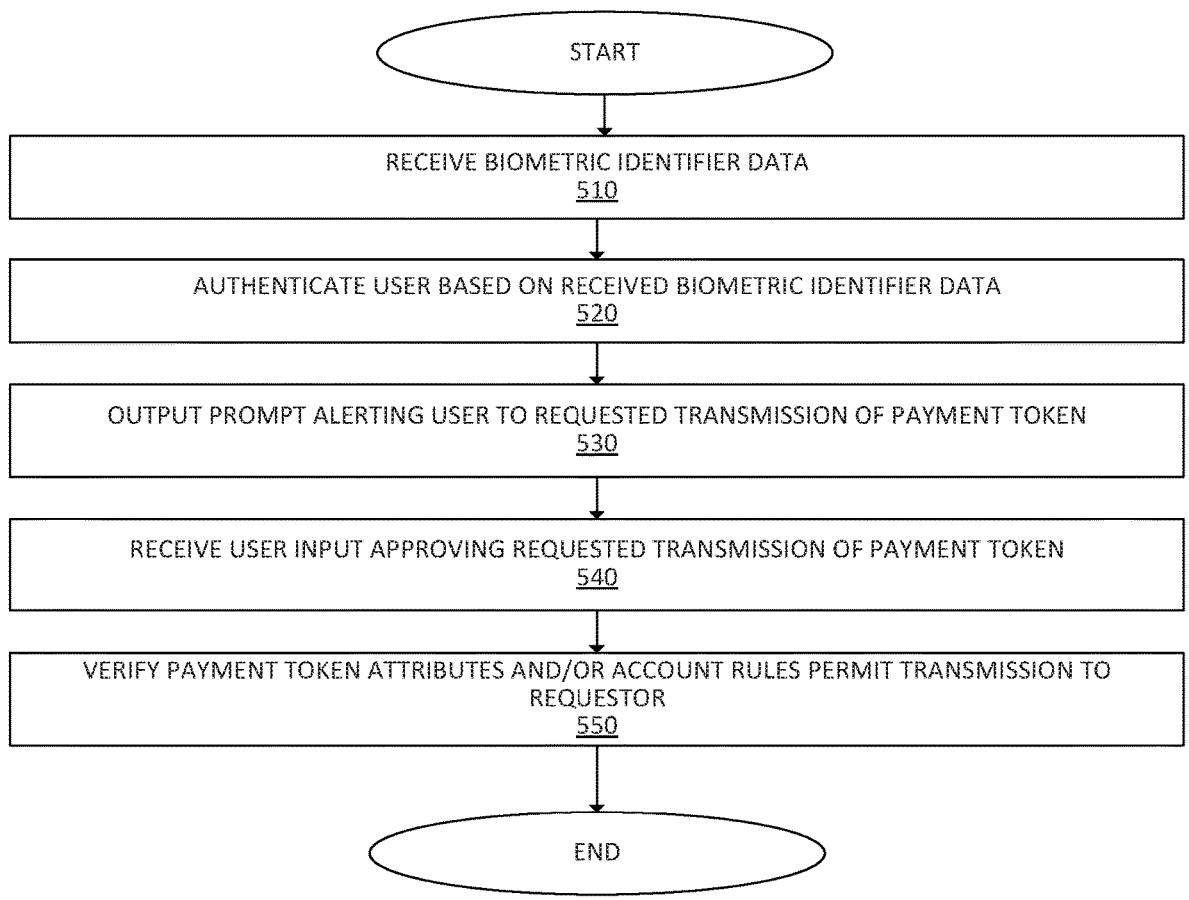
FIG. 5 illustrates an embodiment of a second logic flow.

FIG. 5 illustrates an embodiment of a logic flow 500. The logic flow 500 may be representative of some or all of the operations executed by one or more embodiments described herein. For example, the logic flow 500 may include some or all of the operations performed by the financial application 108 on the computing device 103 responsive to receiving a request to receive the payment token 109 from computing device 104. Embodiments are not limited in this context.

In the illustrated embodiment shown in FIG. 5, the logic flow 500 may begin at block 510. At block 510, the financial application 108 may receive biometric identifier data from the biometric interfaces 110, such as a fingerprint or iris scan. At block 520, the financial application 108 authenticates the user based on the received biometric data. For example, the financial application 108 may determine that the fingerprint data matches known fingerprint data of the user stored in the account data 112 of the financial system 101. At block 530, the financial application 108 outputs an alert indicating that the transfer of the payment token 109 has been requested (e.g., to provide additional security). At block 540, the financial application 108 receives user input approving the requested transmission of the payment token 109. At block 550, the financial application 108 verifies the attributes 204 of the payment token 109 and/or any rules in the account data 112 prior to transmitting the payment token 109 to the requesting device (e.g., the computing device 104). For example, the financial application 108 may determine whether the request originated from an account authorized to use the payment token 109, whether the payment token 109 is valid based on a current time and a specified duration of the payment token, whether the computing device 104 is registered with the account (e.g., based on a known IP address, known MAC address, etc.) associated with the payment token 109, etc.

Figure 6:
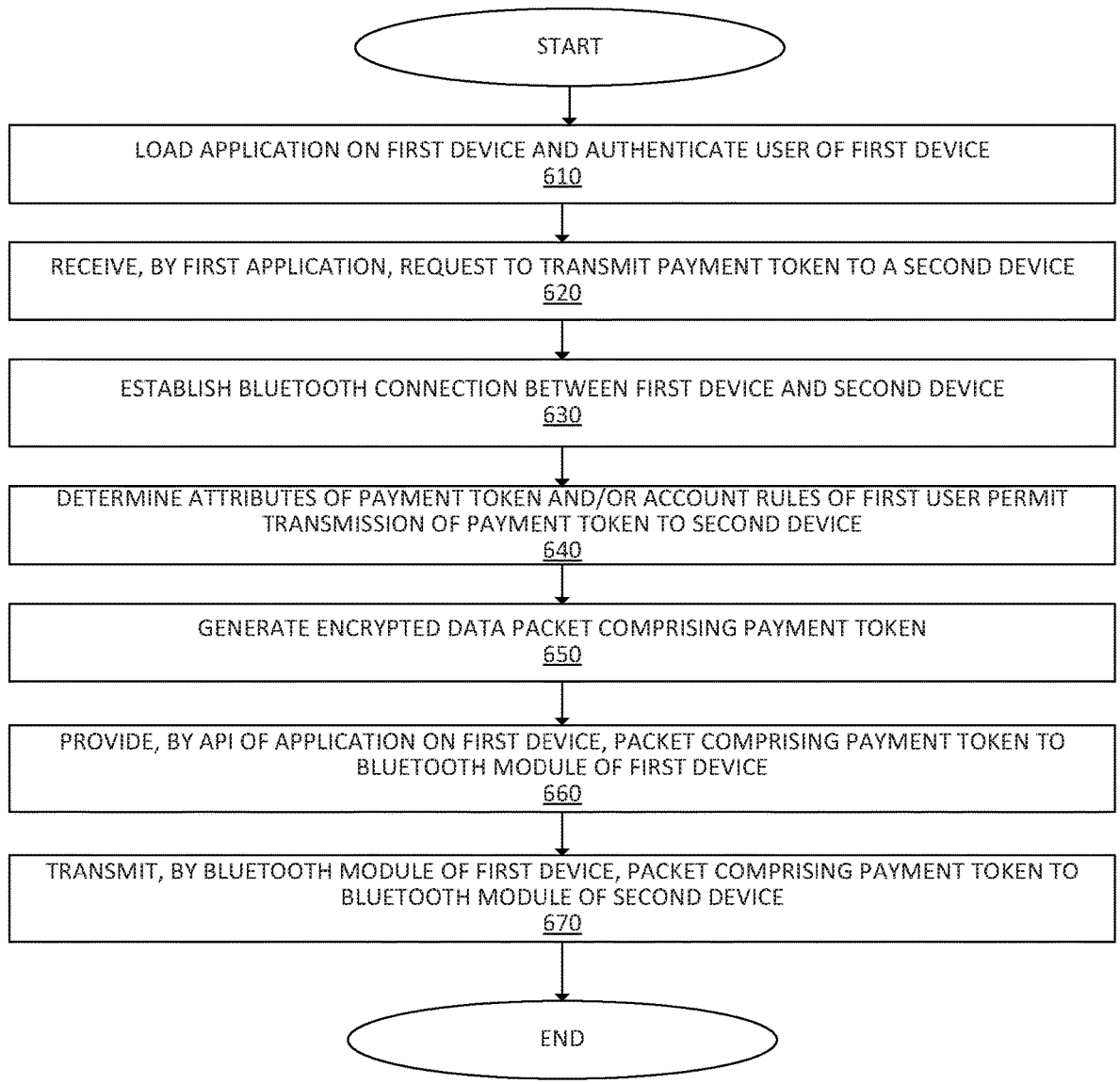
FIG. 6 illustrates an embodiment of a third logic flow.

FIG. 6 illustrates an embodiment of a logic flow 600. The logic flow 600 may be representative of some or all of the operations executed by one or more embodiments described herein. For example, the logic flow 600 may be representative of some or all of the operations performed to directly push a payment token 109 to a computing device. Embodiments are not limited in this context.

In the illustrated embodiment shown in FIG. 6, the logic flow 600 may begin at block 610. At block 610, a first computing device (e.g., the computing device 103) may load the financial application 108 and authenticate a user. As stated, the authentication may be based on username and password, biometric information, and the like. At block 620, the financial application 108 receives a request to transmit the payment token 109 to a second device (e.g., the computing device 104). At block 630, the financial application 108 causes the Bluetooth module 111 of the computing device 103 to establish a Bluetooth connection with the Bluetooth module 111 of the computing device 104.

At block 640 the financial application 108 determines whether the attributes 204 of the payment token 109 and/or any rules in the account data 112 permit transmitting the payment token 109 to the second device. For example, the financial application 108 may determine whether the payment token 109 is currently valid, whether the computing device 104 is registered with the account associated with the payment token 109, etc. At block 650, the financial application 108 may generate one or more encrypted data packets including the payment token 109. Additionally and/or alternatively, the financial application 108 may encrypt the payment token itself. At block 660, an API of the financial application 108 provides the packet(s) including the payment token 109 to the Bluetooth module 111 of the computing device 103. At block 670, the Bluetooth module 111 of the computing device 103 may transmit the packet(s) including the payment token 109 to the Bluetooth module 111 of the computing device 104.

Figure 7:
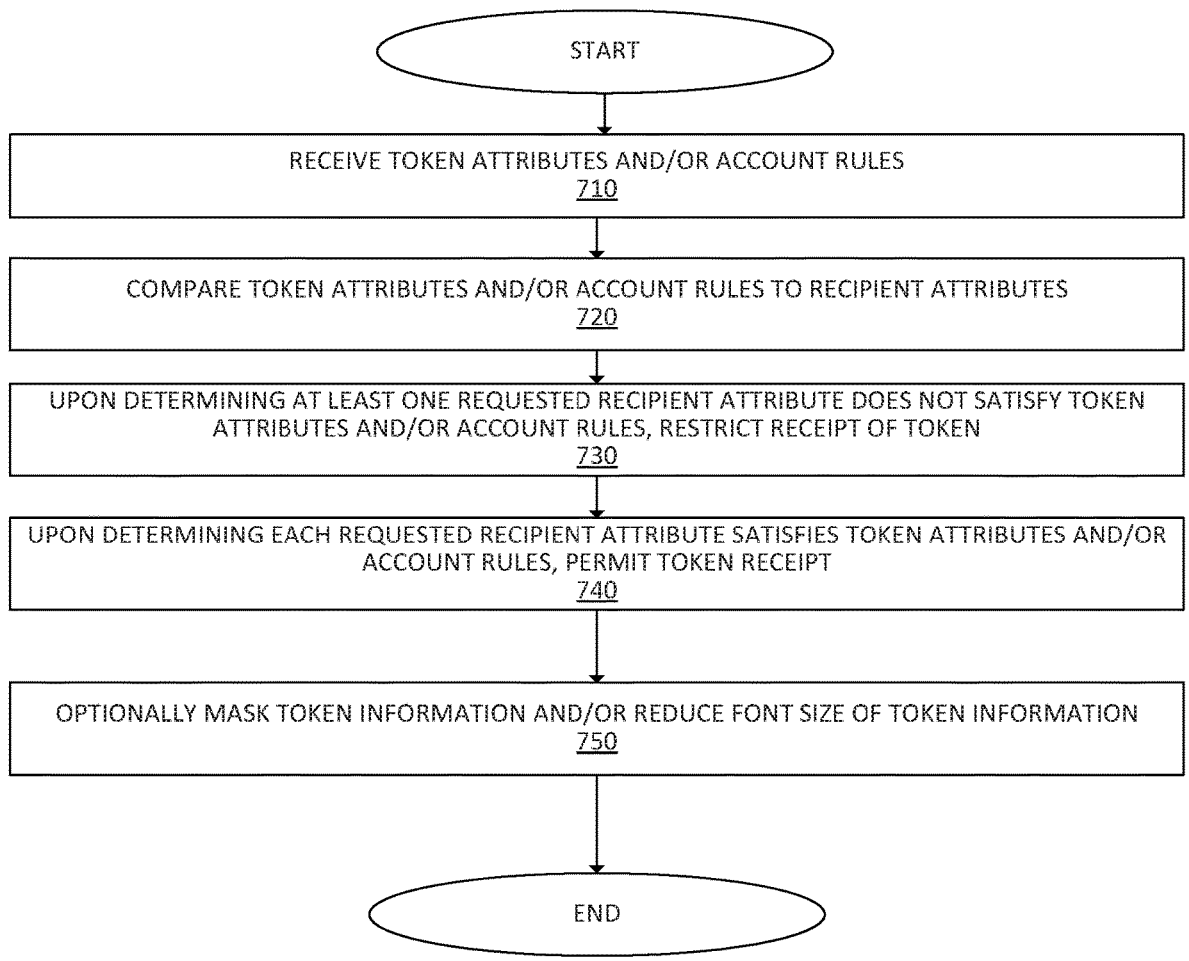
FIG. 7 illustrates an embodiment of a fourth logic flow.

FIG. 7 illustrates an embodiment of a logic flow 700. The logic flow 700 may be representative of some or all of the operations executed by one or more embodiments described herein. For example, a designated component of the computing device 104 (e.g., the web page code 105, the web Bluetooth code 106, and/or an instance of the financial application 108) may perform some or all of the operations of the logic flow 700 after receiving a payment token 109 from the computing device 103. Embodiments are not limited in this context.

In the illustrated embodiment shown in FIG. 7, the logic flow 700 may begin at block 710. At block 710, the web page code 105 receives the attributes 204 of the payment token 109 and/or account rules from the account data 112. In one embodiment, the attributes 204 are metadata of the payment token 109. In another embodiment, the attributes 204 are stored in the account data 112 and received via the network 130. At block 720, the web page code 105 compares the received attributes 204 and/or account rules to recipient attributes (e.g., attributes of the computing device 104, attributes of the account in the financial system 101 the user of computing device 104 has accessed, etc.). At block 730, the web page code 105 restricts receipt of the payment token upon determining at least one attribute of the recipient does not satisfy the corresponding attribute 204 and/or account rule. For example, if the user account in the financial system 101 that has been accessed via the web page code 105 of the computing device 104 is not authorized to use the received payment token 109, the web page code 105 may restrict the receipt of the payment token 109. For example, the web page code 105 may remove the received payment token 109 from memory and transmit an alert to the owner of the payment token 109. At block 740, the web page code 105 permits the receipt of the payment token 109 upon determining each recipient attribute satisfies the corresponding attribute 204 and/or account rule. For example, if the user authenticated with the financial system 101 via the web page code 105 of the computing device 104 is authorized to use the received payment token 109, the web page code 105 may permit the receipt of the payment token 109. At block 750, the web page code 105 may optionally mask the payment token 109 and/or reduce the font size of the payment token 109 to protect the account number 201, expiration date 202, and/or CVV 203 when outputted for display.

Figure 8:
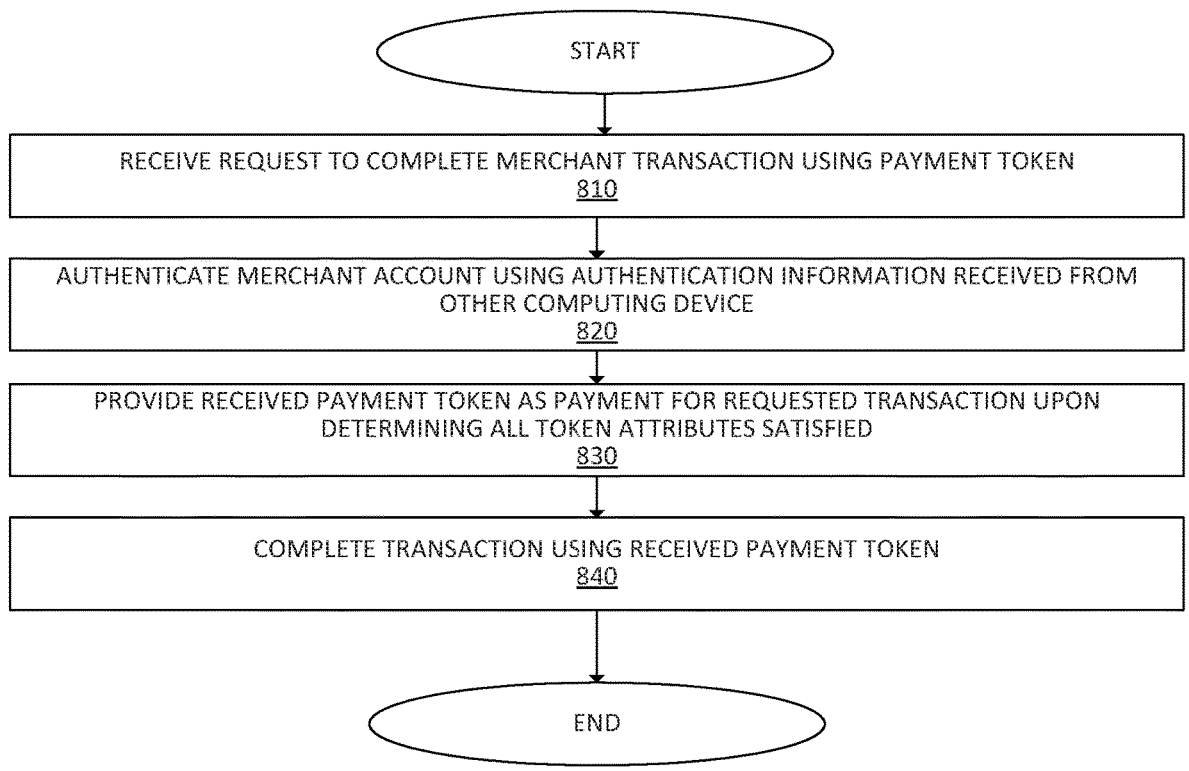
FIG. 8 illustrates an embodiment of a fifth logic flow.

FIG. 8 illustrates an embodiment of a logic flow 800. The logic flow 800 may be representative of some or all of the operations executed by one or more embodiments described herein. For example, the web page code 105 may perform some or all of the steps of the logic flow 800 to use a received payment token 109 to complete a transaction. Embodiments are not limited in this context.

In the illustrated embodiment shown in FIG. 8, the logic flow 800 may begin at block 810. At block 810, the web page code 105 may receive a request from a user of computing device 104 to complete a merchant transaction using the payment token 109 received from computing device 103. At block 820, the web page code 105 may authenticate the user with their account on a merchant interface 120 using authentication information received from the computing device 103. At block 830, the web page code 105 may provide the payment token 109 received from computing device 103 upon determining attributes 204 of the payment token 109 are satisfied. For example, the request may specify to purchase a $100 item on merchant interface 120. However, the token attributes 204 may limit the payment token to $50 on merchant interface 120. As such, the web page code 105 may restrict the use of payment token 109 to purchase the $100 item via merchant interface 120, as the limit of $50 for the merchant has been exceeded. Alternatively, the web page code 105 and/or the merchant interface 120 may permit the use of the payment token up to the limit of $50 and require an additional form of payment for the remaining balance. However, if all attributes are satisfied, the web page code 105 permits the use of the payment token 109. At block 840, the payment token 109 is provided to the merchant interface 120 to complete the transaction.

Figure 9:
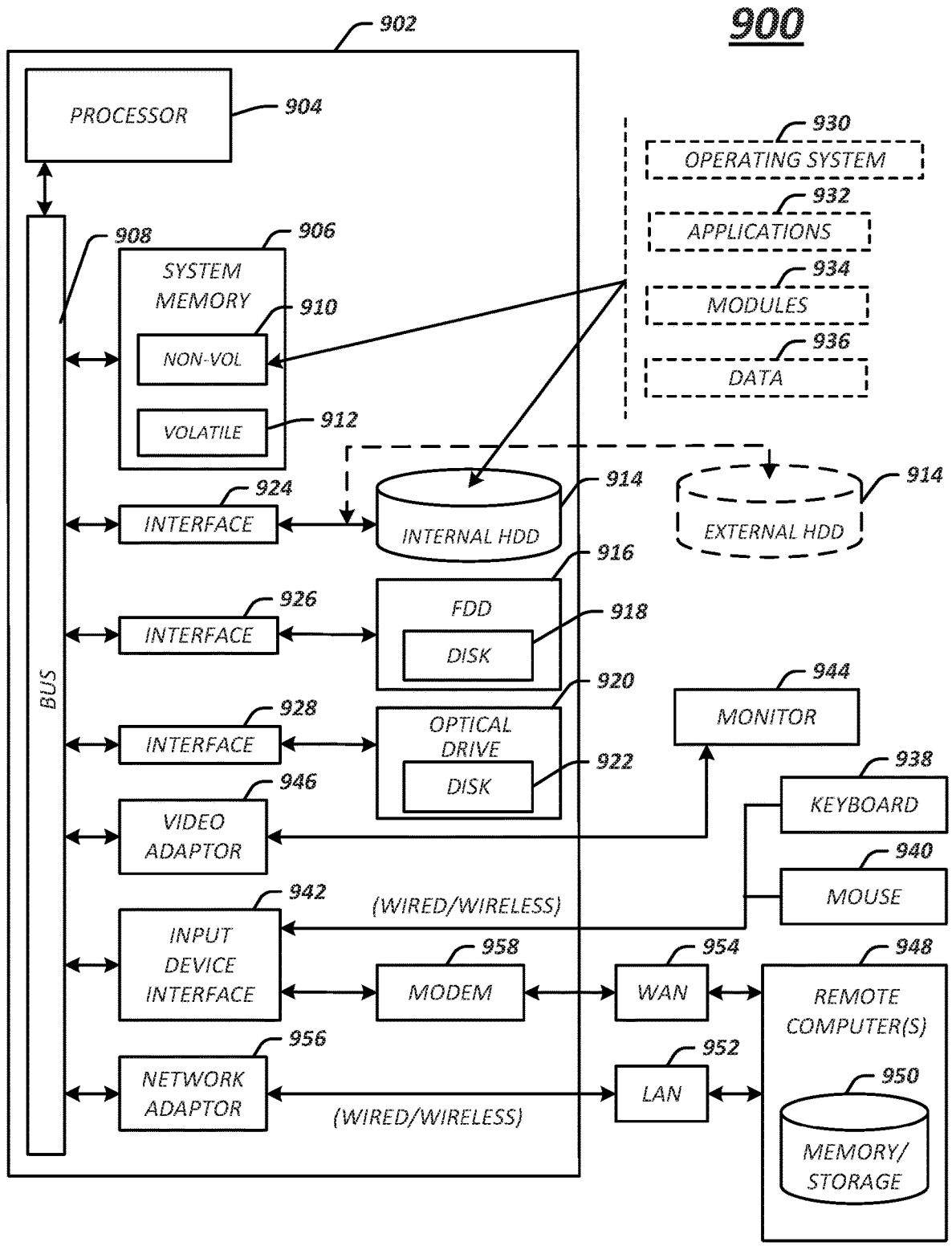
FIG. 9 illustrates an embodiment of a computing architecture.

FIG. 9 illustrates an embodiment of an exemplary computing architecture 900 comprising a computing system 902 that may be suitable for implementing various embodiments as previously described. In various embodiments, the computing architecture 900 may comprise or be implemented as part of an electronic device. In some embodiments, the computing architecture 900 may be representative, for example, of a system that implements one or more components of the system 100. In some embodiments, computing system 902 may be representative, for example, of the financial system 101, merchant system 102, computing device 103, and computing device 104 of the system 100. The embodiments are not limited in this context. More generally, the computing architecture 900 is configured to implement all logic, applications, systems, methods, apparatuses, and functionality described herein with reference to FIGS. 1-8.

As used in this application, the terms "system" and "component" and "module" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 902 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 902.

As shown in FIG. 9, the computing system 902 comprises a processor 904, a system memory 906 and a system bus 908. The processor 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 904.

The system bus 908 provides an interface for system components including, but not limited to, the system memory 906 to the processor 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computing system 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies. The computing system 902 is generally is configured to implement all logic, systems, methods, apparatuses, and functionality described herein with reference to FIGS. 1-8.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 100, e.g., the financial application 108, payment token 109, account data 112, web browser 113, web page code 105, web Bluetooth code 106, account management system 107, and merchant interface 120.

A user can enter commands and information into the computing system 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computing system 902. In addition to the monitor 944, a computer typically includes other peripheral output devices, such as speakers, printers, and so forth.

The computing system 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computing system 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 952 and the WAN 954.

When used in a LAN networking environment, the computing system 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computing system 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computing system 902, or portions thereof, can be stored in the remote memory/storage device 950. It will be appreciated that the network connections shown are exemplary and other means of establishing a communications link between the computers can be used.

The computing system 902 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies (e.g., via the Bluetooth modules 111), among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A system, comprising:
   a processor;
   a wireless communications device; and
   a memory storing instructions which when executed by the processor cause the processor to:
   authenticate, by a web page code executed in a web browser, credentials of a user associated with an account;
   receive, by the web page code, a request to receive a payment token from an external device, the payment token comprising an account number for the account, a card verification value (CVV) for the payment token, an expiration date for the payment token, and a permitted recipient of the payment token;
   receive, by a web application programming interface (API) of the web page code, a respective response from each of a plurality of devices accessible by the wireless communications device, each response specifying that the respective device stores a respective instance of the payment token, the plurality of devices within a predefined distance of the system, the web API executed in the web browser to control the wireless communications device via the web browser without requiring a native application to control the wireless communications device;
   display, by the web API of the web page code, a graphical user interface (GUI) comprising a menu listing the plurality of devices;
   receive, by the web page code via the GUI, selection of a first device of the plurality of devices listed in the menu;
   determine, by an application executing on the processor, that an internet protocol (IP) address and a media access control (MAC) address of the first device are associated with the account in an account database entry for the account;
   determine, by the application, that the first device is registered with the account based on the IP address and the MAC address of the first device being associated with the account;
   establish, by the web API of the web page code, a wireless connection between the wireless communications device of the system and a wireless communications device of the first device;
   receive, by the web API of the web page code based on the determination that the first device is registered with the account, an encrypted data packet comprising the payment token from the first device via the connection between the wireless communications devices, an application executing on the first device providing the payment token to the wireless communications device by an API of the application executing on the first device, wherein the application executing on the first device authenticates the user based at least in part on one or more biometric identifiers associated with the account prior to transmitting the payment token to the first device;
   decrypt, by the web page code, the encrypted data packet based on a cryptographic function and a cryptographic key associated with the account;
   determine, by the web page code based on the expiration date of the payment token, that the payment token has not expired;
   determine, by the web page code, that a merchant is the permitted recipient of the payment token; and
   provide, by the web page code, the payment token to the merchant as payment for a transaction.

2. The system of claim 1, wherein a web code executing in the web browser comprises the web API, wherein the payment token further comprises an authorized value, one or more accounts authorized to receive the payment token, and a duration of time the payment token is valid for use, wherein the account number comprises one of a primary account number and a virtual account number, the memory further storing instructions which when executed by the processor cause the processor to:
   determine that the account is one of the one or more accounts authorized to receive the payment token; and
   store the payment token in a digital wallet.

3. The system of claim 2, the memory further storing instructions which when executed by the processor cause the processor to:
receive, by the web API of the web page code, authentication information for a merchant account with the merchant and associated with the user, wherein the authentication information is received in a second encrypted data packet not including the payment token, wherein the second encrypted data packet not including the payment token is received prior to receiving the payment token.

4. The system of claim 3, the memory further storing instructions which when executed by the processor cause the processor to:
receive, by the web API of the web page code, a second payment token from the first device;
determine, by the web page code based on an expiration date of the second payment token, that the second payment token has expired; and
remove, by the web page code, the second payment token from the memory.

5. The system of claim 1, the memory further storing instructions which when executed by the processor cause the processor to:
identify, by the web API of the web page code, each of the plurality of selectable devices within the predefined distance of the system, the predefined distance comprising a communications range of the wireless communications device of the system; and
generate, by the web page code, the GUI comprising the menu based on the identified devices.

6. The system of claim 1, the memory further storing instructions which when executed by the processor cause the processor to:
display, by the web page code in the GUI, a modified version of the payment token for display in the web browser, the modified version of the payment token comprising a reduced font size of the account number, CVV, and expiration date, the reduced font size smaller than a font size of other content outputted for display in the GUI.

7. The system of claim 1, the one or more biometric identifiers associated with the account comprising a fingerprint, an iris scan, an image of a face, and speech data.

8. A method, comprising:
authenticating, by web page code executing in a web browser of a first device, credentials of a user associated with an account;
receiving, by the web page code executing in the web browser of the first device, a request to receive a payment token, the payment token comprising an account number for the account, a card verification value (CVV) for the payment token, an expiration date for the payment token, and a permitted recipient of the payment token;
receiving, by a web application programming interface (API) of the web page code executing in the web browser of the first device from a wireless communications device of the first device, a respective response from each of a plurality of devices, each response specifying that the respective device stores a respective instance of the payment token, the plurality of devices within a predefined distance of the first device, the web API executed in the web browser to control the wireless communications device of the first device via the web browser without requiring a native application to control the wireless communications device;
displaying, by the web API of the web page code executing in the web browser of the first device, a graphical user interface (GUI) comprising a menu listing the plurality of devices;
receiving, by the web page code executing in the web browser of the first device via the GUI, selection of a second device of the plurality of devices listed in the menu;
determining, by an application executing on the first device, that an internet protocol (IP) address and a media access control (MAC) address of the first device are associated with the account in an account database entry for the account;
determining, by the application, that the first device is registered with the account based on the IP address and the MAC address of the first device being associated with the account;
establishing, by the web API of the web page code executing in the web browser of the first device, a wireless connection between the wireless communications device of the first device and a wireless communications device of the second device;
receiving, by the web API of the web page code executing in the web browser of the first device based on the determination that the first device is registered with the account, an encrypted data packet comprising the payment token from the second device via the connection, an application executing on the second device providing the payment token to the wireless communications device by an API of the application executing on the second device, wherein the application executing on the second device authenticates a user based at least in part on one or more biometric identifiers associated with the account prior to transmitting the payment token to the first device;
decrypting, by the web page code executing in the web browser of the first device, the encrypted data packet based on a cryptographic function and a cryptographic key associated with the account;
determining, by the web page code executing in the web browser of the first device based on the expiration date of the payment token, that the payment token has not expired;
determining, by the web page code, that a merchant is the permitted recipient of the payment token; and
providing, by the web page code, the payment token to the merchant as payment for a transaction.

9. The method of claim 8, wherein the payment token further comprises an authorized value, one or more accounts authorized to receive the payment token, and a duration of time the payment token is valid for use, wherein the account number comprises one of a primary account number and a virtual account number, the method further comprising:
storing the payment token in a digital wallet.

10. The method of claim 9, further comprising:
receiving, by the web page code executing in the web browser of the first device, authentication information for a merchant account with the merchant and associated with the user, wherein the authentication information is received in a second encrypted data packet not including the payment token, wherein the second data packet not including the payment token received prior to receiving the payment token.

11. The method of claim 10, further comprising:
receiving, by the web API of the web page code executing in the web browser of the first device, a second payment token from the second device;

determining, by the web page code executing in the web browser of the first device based on an expiration date of the second payment token, that the second payment token has expired; and removing, by the web page code executing in the web browser of the first device, the second payment token from a memory of the first device.

12. The method of claim 8, further comprising:

identifying, by the web API of the web page code executing in the web browser of the first device, each of the plurality of selectable devices within the predefined distance of the first device, the predefined distance comprising a communications range of the wireless communications device of the first device.

13. The method of claim 8, further comprising:

outputting, by the web page code in the GUI, a modified version of the payment token for display in the web browser, the modified version of the payment token comprising a reduced font size of the account number, the CVV, and the expiration date, the reduced font size smaller than a font size of other content outputted for display in the GUI.

14. The method of claim 8, the one or more biometric identifiers associated with the account comprising a fingerprint, an iris scan, an image of a face, and speech data.

15. A non-transitory computer-readable storage medium storing computer-readable program code executable by a processor of a computing device to cause the processor to:

authenticate, by a web page code executed in a web browser, credentials of a user associated with an account;

receive, by the web page code, a request to receive a payment token from an external device, the payment token comprising an account number for the account, a card verification value (CVV) for the payment token, an expiration date for the payment token, and a permitted recipient of the payment token;

receive, by a web application programming interface (API) of the web page code, a respective response from each of a plurality of devices accessible by a wireless communications device of the computing device, each response specifying that the respective device stores a respective instance of the payment token, the plurality of devices within a predefined distance of the computing device, the web API executed in the web browser to control the wireless communications device via the web browser without requiring a native application to control the wireless communications device;

display, by the web API of the web page code, a graphical user interface (GUI) comprising a menu listing the plurality of devices;

receive, by the web page code via the GUI, selection of a first device of the plurality of devices listed in the menu;

determine, by an application executing on the processor, that an interne protocol (IP) address and a media access control (MAC) address of the first device are associated with the account in an account database entry for the account;

determine, by the application, that the first device is registered with the account based on the IP address and the MAC address of the first device being associated with the account;

establish, by the web API of the web page code, a wireless connection between the wireless communications device of the computing device and a wireless communications device of the first device;

receive, by the web API of the web page code based on the determination that the first device is registered with the account, an encrypted data packet comprising the payment token from the first device via the connection between the wireless communications devices, an application executing on the first device providing the payment token to the wireless communications device by an API of the application executing on the first device, wherein the application executing on the first device authenticates the user based at least in part on one or more biometric identifiers associated with the account prior to transmitting the payment token to the first device;

decrypt, by the web page code, the encrypted data packet based on a cryptographic function and a cryptographic key associated with the account;

determine, by the web page code based on the expiration date of the payment token, that the payment token has not expired;

determine, by the web page code, that a merchant is the permitted recipient of the payment token; and provide, by the web page code, the payment token to the merchant as payment for a transaction.

16. The computer-readable storage medium of claim 15, wherein a web code executing in the web browser comprises the web API, wherein the payment token further comprises an authorized value, one or more accounts authorized to receive the payment token, and a duration of time the payment token is valid for use, wherein the account number comprises one of a primary account number and a virtual account number, further comprising computer-readable program code executable by the processor to cause the processor to:

determine that the account is one of the one or more accounts authorized to receive the payment token; and store the payment token in a digital wallet.

17. The computer-readable storage medium of claim 15, further comprising computer-readable program code executable by the processor to cause the processor to:

receive, by the web API of the web page code, authentication information for a merchant account with the merchant and associated with the user, wherein the authentication information is received in a second encrypted data packet not including the payment token, wherein the second encrypted data packet not including the payment token is received prior to receiving the payment token.

18. The computer-readable storage medium of claim 17, further comprising computer-readable program code executable by the processor to cause the processor to:

receive, by the web API of the web page code, a second payment token from the first device;

determine, by the web page code based on an expiration date of the second payment token, that the second payment token has expired; and remove, by the web page code, the second payment token from the medium.

19. The computer-readable storage medium of claim 15, further comprising computer-readable program code executable by the processor to cause the processor to:

identify, by the web API of the web page code, each of the plurality of selectable devices within the predefined distance of the computing device, the predefined distance comprising a communications range of the wireless communications device of the computing device; and generate, by the web page code, the GUI comprising the menu based on the identified devices.

20. The computer-readable storage medium of claim 15, further comprising computer-readable program code executable by the processor to cause the processor to:
display, by the web page code in the GUI, a modified version of the payment token for display in the web browser, the modified version of the payment token comprising a reduced font size of the account number, CVV, and expiration date, the reduced font size smaller than a font size of other content outputted for display in the GUI.

\* \* \* \* \*